(12) United States Patent
Wu

(10) Patent No.: US 11,276,112 B2
(45) Date of Patent: Mar. 15, 2022

(54) TRANSACTION CLASSIFICATION BASED ON TRANSACTION TIME PREDICTIONS

(71) Applicant: INTUIT INC., Mountain View, CA (US)

(72) Inventor: Grace Wu, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 697 days.

(21) Appl. No.: 15/935,997

(22) Filed: Mar. 26, 2018

(65) Prior Publication Data

US 2019/0295158 A1 Sep. 26, 2019

(51) Int. Cl.
*G06Q 40/02* (2012.01)
*H04L 67/50* (2022.01)
*H04W 4/029* (2018.01)

(52) U.S. Cl.
CPC ............. *G06Q 40/02* (2013.01); *H04L 67/22* (2013.01); *H04W 4/029* (2018.02)

(58) Field of Classification Search
CPC ........ G06Q 40/02; H04W 4/029; H04L 67/22
See application file for complete search history.

(56) References Cited

U.S. PATENT DOCUMENTS

| | | | |
|---|---|---|---|
| 8,170,932 B1 | 5/2012 | Krakowiecki et al. | |
| 8,661,038 B1 | 2/2014 | Whittam et al. | |
| 8,768,838 B1* | 7/2014 | Hoffman | G06Q 40/00 705/44 |
| 10,185,948 B2* | 1/2019 | Kumaraguruparan | G06Q 20/202 |
| 2007/0174082 A1* | 7/2007 | Singh | G06Q 20/3224 705/44 |
| 2008/0215475 A1* | 9/2008 | Ramer | G06Q 30/02 705/37 |
| 2009/0222364 A1 | 9/2009 | McGlynn et al. | |
| 2012/0047052 A1 | 2/2012 | Patel | |
| 2012/0303425 A1* | 11/2012 | Katzin | G06Q 20/32 705/14.4 |

(Continued)

OTHER PUBLICATIONS

International Search Report/ Written Opinion issued to PCT/US2019/013906 dated May 9, 2019.

*Primary Examiner* — Bennett M Sigmond
*Assistant Examiner* — Xavier M. Bennett
(74) *Attorney, Agent, or Firm* — Patterson + Sheridan, LLP

(57) ABSTRACT

Certain aspects of the present disclosure provide techniques for predicting a transaction time based on user position data. In certain aspects, a method for predicting a transaction time based on user position data includes obtaining a transaction record and one or more user positions associated with a user. The method also includes obtaining one or more business records associated with each respective user position. The method further includes calculating one or more similarity scores, where each similarity score is based on a similarity between a respective business record and the transaction record. The method also includes associating the transaction record with a business record based on a maximum similarity score of the one or more similarity scores. The method further includes determining a predicted transaction time for the transaction record based on at least a timestamp of a user position associated with the business record associated with the transaction record.

20 Claims, 5 Drawing Sheets

(56) References Cited

U.S. PATENT DOCUMENTS

| | | | |
|---|---|---|---|
| 2013/0191213 A1* | 7/2013 | Beck | G06Q 30/0267 |
| | | | 705/14.53 |
| 2014/0058909 A1 | 2/2014 | Lobana et al. | |
| 2016/0203506 A1* | 7/2016 | Butler, IV | G06Q 30/0222 |
| | | | 705/14.23 |
| 2017/0195359 A1* | 7/2017 | Grigoryan | G06Q 40/025 |
| 2019/0114614 A1* | 4/2019 | Kumaraguruparan | |
| | | | G06Q 20/405 |
| 2020/0019950 A1* | 1/2020 | Poole | G06Q 20/34 |

* cited by examiner

TRANSACTION CLASSIFICATION BASED ON TRANSACTION TIME PREDICTIONS

INTRODUCTION

Aspects of the present disclosure relate to predicting a transaction time based on positioning data, such as satellite positioning data.

Machine-learning models enable computing systems to develop improved functionality without explicitly being programmed. Given a set of training data, a machine-learning model can generate and refine a function that predicts a target attribute for an instance based on other attributes of the instance. For example, a machine learning model may be used by an application to classify a user's transactions as, e.g., business or personal, for the purpose of accurately calculating the user's business-related income and expenses. In such an example, the instance represents a transaction and the target attribute is the transaction's category or classification. The machine-learning model, in that case, can be trained to predict the transaction's classification based on the transaction's other attributes, such as the transaction's description and amount.

An additional set of attribute that may enable the machine-learning model to provide a more accurate classification for a transaction is the transaction's time. For example, a transaction for coffee on a weekday after the start of business hours may more likely be a business-related expense than a personal expense. However, electronic transaction records received from a third-party entity (e.g., a bank) generally do not provide an accurate transaction time. For example, a timestamp associated with a transaction's electronic transaction record may indicate when the transaction was processed or posted on a user's bank records and not when the transaction actually occurred. In some cases, accurate transaction times may be available from the bank, but at a significant cost. In some other cases, accurate transaction times may also be manually obtained from the bank for each transaction, such as by calling the bank for each transaction's time of occurrence. Neither of the aforementioned methods of getting accurate transaction time data are desirable when trying to incorporate such transaction data into a model to improve other services.

BRIEF SUMMARY

Certain embodiments provide a method of predicting a transaction time based on user position data. The method generally includes obtaining a transaction record associated with a user, the transaction record comprising a transaction description. The method also includes obtaining one or more user positions associated with the user, wherein each user position comprises a timestamp. The method further includes obtaining one or more business records associated with each respective user position of the one or more user positions, wherein an establishment corresponding to each business record associated with a respective user position is within a threshold range of the respective user position. The method also includes calculating one or more similarity scores, wherein each similarity score of the one or more similarity scores is based on a similarity between a respective business record of the one or more business records and the transaction record. The method further includes associating the transaction record with a business record of the one or more business records based on a maximum similarity score of the one or more similarity scores. The method also includes determining a predicted transaction time for the transaction record based on at least a timestamp of a user position associated with the business record associated with the transaction record.

Also described herein are embodiments of a non-transitory computer readable medium comprising instructions to be executed in a computer system, wherein the instructions when executed in the computer system perform the method described above for predicting a transaction time based on user position data.

Also described herein are embodiments of a computer system, wherein software for the computer system is programmed to execute the method described above for predicting a transaction time based on user position data.

Other embodiments may comprise, for example, an apparatus or processing system configured to perform the aforementioned method or a non-transitory computer-readable medium comprising instructions that when executed by a processor of an apparatus, cause it to perform the aforementioned method.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
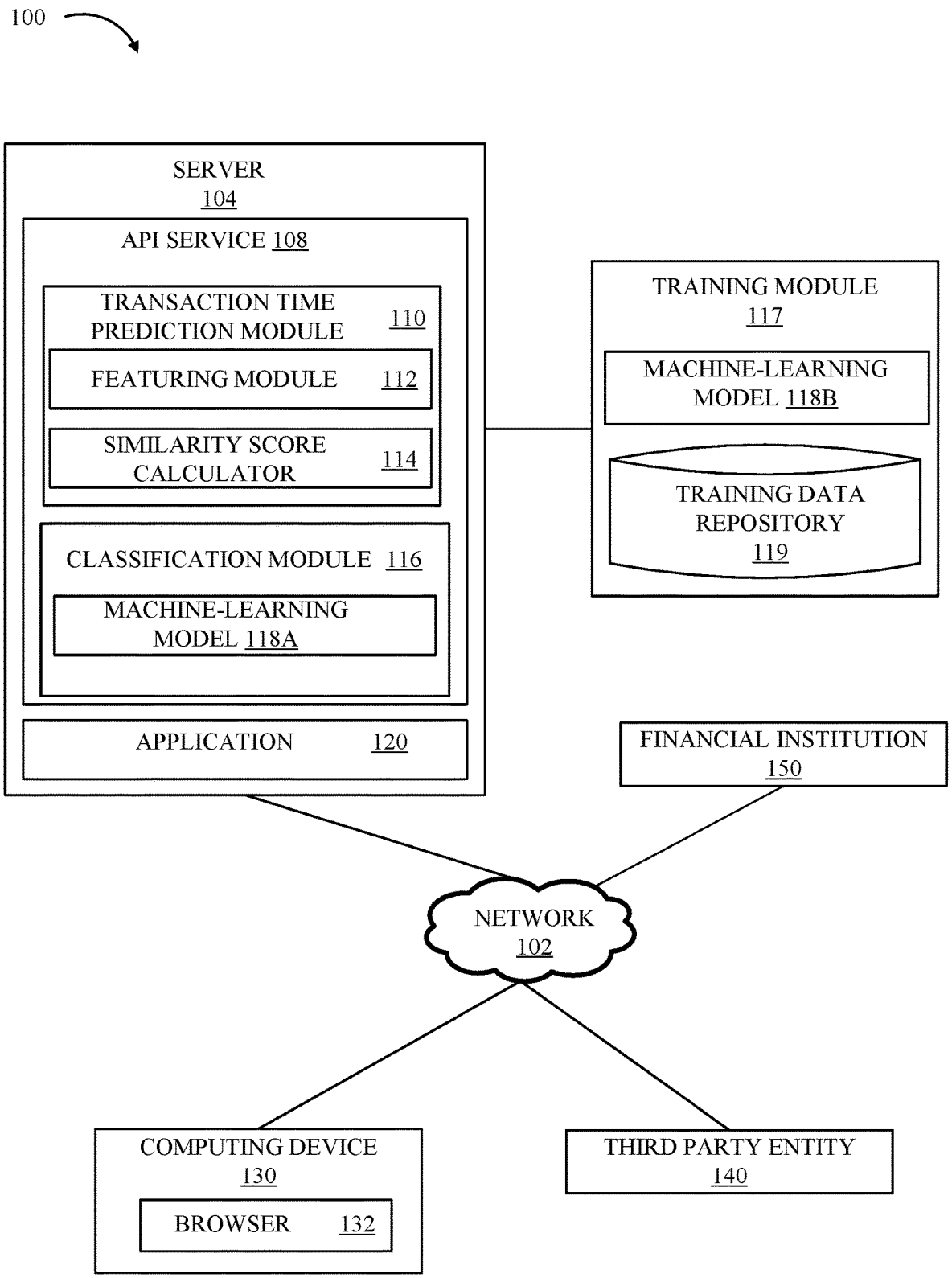
FIG. 1 illustrates an example computing network environment where a transaction classification machine-learning model is implemented, in accordance with certain embodiments.

Aspects of the present disclosure provide apparatuses, methods, processing systems, and computer readable mediums for predicting the time at which a transaction has occurred based on satellite positioning data.

The following description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

A machine learning or predictive model may be used to classify user transactions as, for example, business or personal transactions. A number of parameters may be used as input into the predictive model including a transaction amount or description. However, predicting the time at which the transaction occurred and imputing the predicted time into the model may help improve the accuracy of the classification performed by the model. For example, if a user conducts a transaction (e.g., pays for lunch) during the weekend, it's more likely that the corresponding transaction is personal and not business related. However, if the same transaction occurs during the week for, it is more likely that the transaction is related to the user's business. To classify a given transaction, a transaction record associated with the transaction may be received from the user's financial institution. The transaction record may, in some cases, include a timing data that generally does not reflect the time at which the transaction actually occurred. For example, the timing data may reflect the time when the transaction was processed or posted by the user's financial institution. Accordingly, certain embodiments described herein relate to predicting the time at which the transaction actually occurred by examining the user trips or locations around the time indicated by the timing data. The user trips or locations may be received from a mileage tracking application and may all have timestamps. Names and other information about businesses around those user locations may then be obtained and compared to information received as part of the transaction record. A certain business is then selected as being the most likely location where the transaction occurred and the timestamp of a user trip or location that was used to obtain the business name of the selected business is then identified as a predicted time of when the transaction actually occurred. The predicted time and the other information in the transaction record are then inputted into the predictive model to provide a more accurate classification of the transaction.

FIG. 1 illustrates a computing network environment 100 where a transaction classification machine-learning model is implemented, according to some embodiments. As shown, the computing network environment 100 includes a network 102, a computing device 130, a server 104, a training module 117, and a third-party entity 140. A browser 132 executing at computing device 130 communicates with application 120 via network 102. Note that, in some embodiments, application 120 may also be a standalone application that executes on computing device 130 without using browser 132 at all.

A user (e.g., a self-employed person or a company representative) of computing device 130 can log on to application 120 via browser 132 and access the functionality that application 120 provides. In some embodiments, application 120 may be a mobile application or an application executed on a desktop computer. In one example, application 120 is a tax-related software that determines a tax liability for the user. In such an example, application 120 can determine the tax liability based, at least in part, on monetary transactions recorded in an account for the user. The transactions may represent, for example, different types of income and expenses (e.g., reflected by debits and credits to an account). To supply records of these transactions to application 120, the user can provide login credentials that allow application 120 to access electronic transaction records provided by a financial institution 150, such as a bank, where the user has an account. Thereafter, application 120 can use the login credentials to download the electronic transaction records from the financial institution 150 through network 102 (e.g., via a secure website provided by the bank). Alternatively, the user can manually provide transaction records (e.g., by keying in amounts and descriptions).

Note that although application 120 is described herein as an application that determines a user's tax liability, in some embodiments, application 120 may be any type of application that benefits from obtaining transaction times relating to a user's transactions. For example, in some embodiments, application 120 may be software that categorizes the user's expenses and provides the user with a report of the user's (e.g., business and personal) expenditures. In such embodiments, having access to transaction times of the user's transactions, for example, enables application 120 to categorize certain transactions as business transactions and other transactions as personal transactions based on the transaction times (and other factors) and provide separate reports (e.g., a business income/expense report and a personal expense report) to the user.

In embodiments where application 120 determines the user's tax liability, the type or category of a transaction may affect its treatment with respect to the user's tax liability. Thus, in order to predict the user's tax liability more accurately, it is best if the transactions are classified or labeled correctly. For example, a self-employed user who runs a business may have two cars, one used to conduct business operations and another for personal use. In such an example, the user may pay for gas using a credit card that is used for both personal and business expenses. When calculating the user's business expenses to determine the business's tax liability, it is important to determine whether the expense related to the gas payment is a personal or a business expense.

To determine a transaction's classification (e.g., business, personal, etc.), application 120 accesses Application Programming Interface (API) service 108. API service 108 exposes predictive functionality of classification module 116 to application 120. In some embodiments, application 120 accesses API service 108 programmatically (e.g., via function calls programmed in an application or function library) or via a web resource for web-based applications. In some embodiments, application 120 can invoke functionality exposed by API service 108 using a Representational State Transfer function call (a REST call), queries in an HTTP POST request, a Simple Object Access Protocol (SOAP) request, or other protocols that allow client software to invoke functions on a remote system. In some embodiments, classification module 116 may be a microservice implemented within a microservice-based application architecture. Note that, in some embodiments, classification prediction may be provided through another type of software service that does not use an API.

As an example, for a given transaction, application 120 may obtain a corresponding transaction record from the user's financial institution 150. For example, using the user's credentials, application 120 is able to call an API provided by the user's bank and obtain the transaction record. The obtained transaction record may include at least a description of the transaction, e.g., a text string, and an amount of the transaction. When accessing API service 108 and requesting a classification for a transaction, application 120 includes the transaction record obtained from the bank, or details therefrom, in its request to API service 108. Having received the transaction record from application 120, in some embodiments, API service 108 may identify a transaction type (e.g., entertainment, medical, supplies, service, etc.) for the respective transaction using a variety of methods. For example, in some embodiments, API service 108 may determine the transaction type by comparing one or more words in the transaction's descriptive string (sometimes referred to as "tokens") to a dictionary and select, if any, a matching entry (e.g., transaction type) for the one or more words.

In one example, suppose the descriptive string is "Acme Burger 5463 Main Street, Beverly Hills Calif. 90210." API service 108 selects the token sequence "Acme Burger" for lookup in a dictionary (e.g., by determining that "Acme Burger" is likely to be a merchant name). API service 108 also selects the token sequences "Acme Burger," "Beverly Hills Calif.," and "Burger" for lookup in the dictionary. The selected tokens are then compared to a dictionary to determine if any matches exist. In a dictionary, a matching entry maps at least one of the tokens to a transaction type (e.g., entertainment, food, groceries etc.). For example, a matching entry found for the token "Burger" may map to the "Food" transaction type. Other methods (e.g., associative arrays etc.) may also be used by API service to determine the transaction type for a transaction record associated with a transaction.

After determining a transaction type for the transaction, API service 108 may send the transaction record and the transaction type to classification module 116. Thereafter, classification module 116 may decompose the transaction record into a set of features (i.e., "featurize" the transaction), including a feature that indicates the transaction type. Using the features generated by classification module 116 as input, machine-learning model 118A then predicts a classification for the transaction from a set of possible classifications (e.g., business, personal, etc.).

A variety of methods may be used for featurizing the transaction record. For example, classification module 116 may extract (e.g., using a featuring module) a plurality of N-grams from the transaction record's descriptive string (or strings, in examples where more than one descriptive string is included in the transaction information). As used herein, an N-gram refers to a contiguous sequence of N tokens found in a given sequence of text, where N is a positive integer. Classification module 116 determines a set of features for the transaction based on the plurality of N-grams. The set of features may also include the transaction type, as described above. In one example, suppose the set of features comprises one feature for each possible transaction types in a set of possible transaction types. If the set of possible transaction types includes {groceries, food, medical, service, rent, etc.} and the transaction type assigned by API service 108 is "entertainment," the set features may include {0, 1, 0, 0, 0, etc.}. In general, the feature corresponding to the assigned transaction type is given the value of 1 (or some other nonzero value that serves as a weight), while the features corresponding to the other possible transaction types are given the value of 0.

Having determined a classification for the transaction, API service 108 sends an API response to application 120 indicating the classification in reply to the API request. When the API response is received, application 120 can use the classification to help perform one or more functions. For example, application 120 may update an aggregate amount associated with the user based on the classification (e.g., by adding the amount of the transaction to an aggregate amount). For example, the aggregate amount may be the sum of all deductible business expenses for the user in the current calendar year. Thus, if the transaction is a payment of gas for business operations, application 120 adds the amount of gas payment to the aggregate amount of deductible expenses.

In some embodiments, application 120 also solicits input from the user to verify that the classification was accurately predicted. For example, application 120 can present the classification to the user for inspection and verification through a graphical user interface (GUI), such as via browser 132. In some embodiments, the classification is presented alongside the transaction information in a pop-up box or another viewing area in the graphical user interface with buttons or other graphical elements that allow the user to signal approval or disapproval of the predicted label. In response, the user can indicate the label is correct or that the classification is incorrect. If the user indicates the classification is incorrect, the application 120 presents the user with the set of possible categories in the classification scheme (e.g., in a drop-down box or other selection-type user interface element) and allows the user to indicate a corrected classification for the transaction. If the user indicates a corrected classification, the application 120 adds the transaction information, with the corrected classification, to training data repository 119. Similarly, if the user affirmatively indicates that the classification is correct, the transaction information (tagged with the confirmed classification) may be added to training data repository 119.

In some embodiments, one or more methods may be used to help assure that a user who confirms that the label is correct actually viewed the classification, etc. For example, a user viewing the classification on a mobile device (e.g., smartphone) may not pay attention to the classification or carefully read the question, in which case the user may quickly click the "correct" button and confirm the classification, even when the classification is incorrect.

Training data repository 119 includes transaction information from previous transactions and corresponding classifications. Training data repository 119 is also periodically updated when user feedback is received from the user. In some embodiments, each time training data repository 119 is updated, training module 117 updates (e.g., by retraining) machine-learning model 118B. After each retraining, machine-learning model 118B is copied over to classification module 116 so that machine-learning model 118A stays up-to-date. Thus, the machine-learning model 118B may be updated "offline" so that classification module 116, including machine learning model 118A, is never offline. Further, machine learning model 118B can be tested and validated without risking the ongoing operations of classification module 116, including machine learning model 118A.

While FIG. 1 illustrates one embodiment in which certain elements are located at separate network-connected locations, in other embodiments some or all elements may be located in different places. For example, in a cloud-based computing environment, API service 108, application 120, training module 117, training data 119, classification module 116, and machine-learning model 118A may be implemented across different hardware hosts, virtual machines, and other physical or virtual resources without departing from the spirit and scope of the disclosure.

As described above, using other attributes in addition to the description of the transaction, the transaction type, and an amount of the transaction, may enable machine-classification module 116 to provide a more accurate classification for a transaction. For example, determining whether a transaction occurred during the weekend as opposed to during the week, or whether the transaction occurred during business hours as opposed to outside normal business hours, may improve the classification accuracy of machine-learning model 118A. However, in some cases, time-related attributes of a transaction may not be available. For example, transaction records received from the bank may not include the time or date of the transaction. In another example, the transaction record may comprise timing data that may indicate a date of the transaction but not the time. In some other cases, a transaction record's timing data may indicate a day, month, year, and time. However, these data points may not necessarily be reflective of the actual time at which the transaction occurred. In some instances, this is because of the way businesses process transactions, which results in generating timing data for a transaction that does not reflect when the transaction actually took place but, instead, reflecting when the business, for example, completed processing the transaction or when the transaction was posted on the user's account. For example, a transaction for a meal at a restaurant may have taken place on a first date, but not actually "posted" to the financial account until a second date. If, for example, the first date was a Thursday and the second (posted) date was a Saturday, this may negatively affect the classification scheme.

An improvement to the aforementioned system includes configuring a capability to predict the time at which a certain user transaction has occurred based on user position data (e.g., satellite-based positions) associated with a transaction. Because the transaction records provided by a financial institution do not include user position data, it is necessary to associate user position data with a user transaction record. For example, application 120 may obtain a transaction record from financial institution 150 (e.g., via an API). To determine the transaction's classification, as described above, application 120 then accesses and sends API service 108 information relating to the transaction. API service 108, for example, receives the transaction record from application 120, which may include a transaction description and a transaction amount. In some embodiments, as part of the transaction record, API service 108 may also receive timing data, from application 120 (e.g., received from financial institution 150 as part of the transaction record or generated by application 120). As described above, the timing data that is obtained from application 120 may not reflect the exact time or date of when the transaction actually took place. As a result, using the time indicated by this timing data may result in an incorrect classification and also an introduction of inaccurate data into training data 119. Accordingly, a transaction time production module 110 may be configured to predict a more accurate time for when the transaction took place and, subsequently, replace the time associated with the transaction record's timing data (i.e., provided by financial institution 150) with the predicted transaction time for transaction classification purposes.

In order to predict a more accurate time for a given transaction, transaction prediction module 110 may obtain user position data. User position data may generally include one or more positions and associated timestamp(s) for the one or more positions. In some embodiments, the positions may be Global Positioning System (GPS) positions, GLONASS positions, or other satellite-based position data. In yet other embodiments, the positions may be based on inertial position systems.

In some embodiment, user position data may be collected by a mobile application running on the user's mobile device (e.g., smartphone) and thereafter may be sent to application 120 through a network (e.g., network 102). In one example, a user may use a mileage tracking application for purposes of capturing reimbursable mileage during business activities. The mileage tracking application may record user position data at some predetermined interval (e.g., every thirty seconds), or the interval may be dynamic (e.g., based on speed of the user, where the interval is shorter as the speed increases). In some embodiments, a mileage tracking capability may be a part of a mobile component of application 120.

In some embodiments, the mobile application may automatically determine start and stop locations of the user's trips based on a variety of factors, such as based on the amount of time the user spends in transit for each trip, the amount of time the user spends at each location, and the amount of time that has passed since the user's last recorded trip. For each trip's start and stop locations, the mobile application (e.g., mileage tracking application) records user position data (e.g., satellite-based position data) as well as timestamps. In some embodiments, the mobile application may send position data for all of the user's movements (e.g., including data while the user is in transit), while in other embodiments the mobile application may only send start and stop locations (e.g., origin and destination locations).

Application 120 may thereafter provide the user position data to transaction time prediction module 110 to be associated with user transactions. As further described in relation to FIG. 3, below, transaction time prediction module 110 predicts a transaction time for a given transaction based, for example, on user position data. In some cases, transaction time prediction module may use the predicted transaction time to refine the timing data provided by, for example, financial institution 150 as part of the transaction record (e.g., by adding a specific time where the transaction record's timing data only included a date), or replace the timing data entirely.

Figure 2:
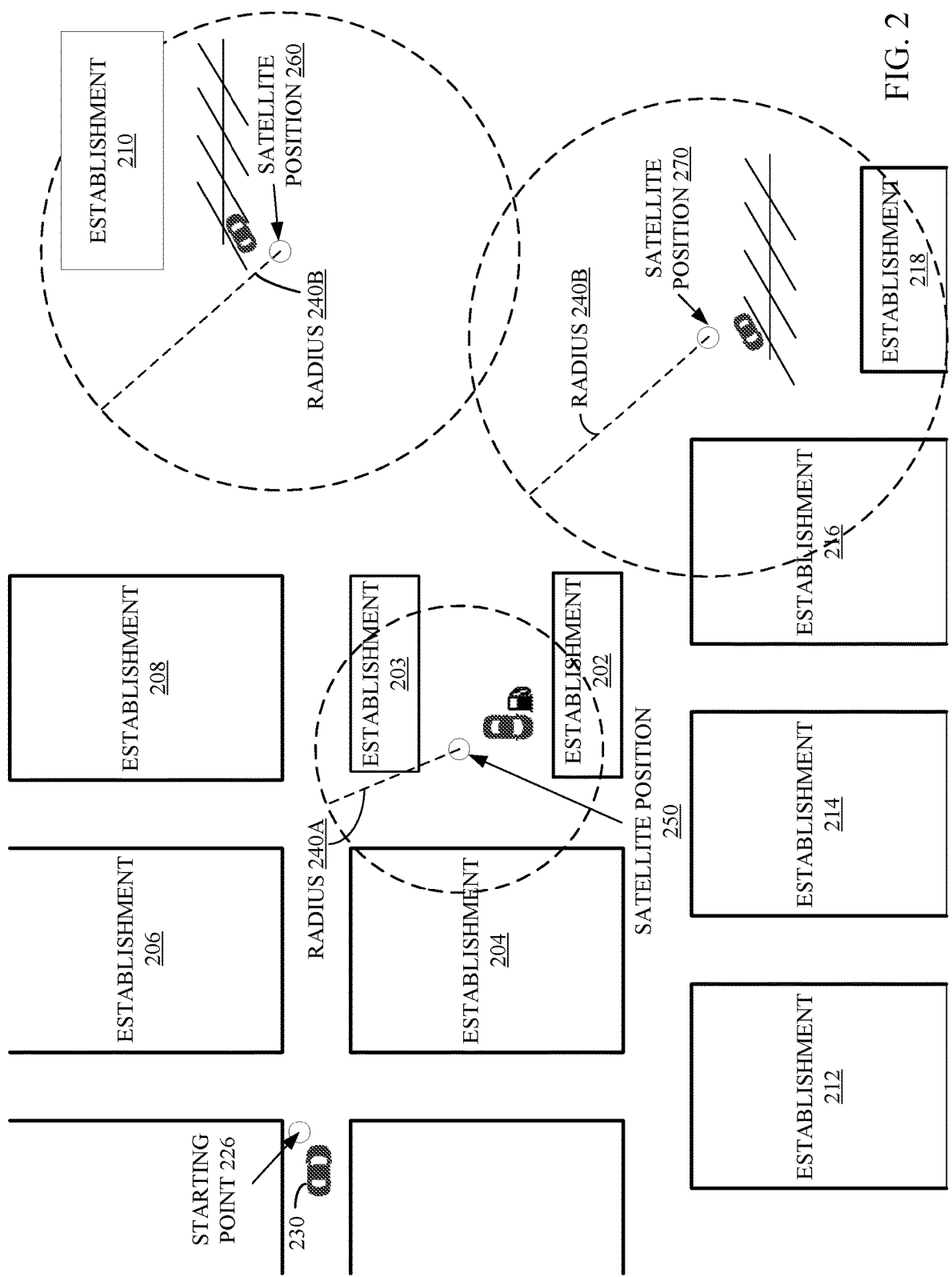
FIG. 2 illustrates a number of user positions associated with a number of user trips on a map, in accordance with certain embodiments.

FIG. 2 illustrates examples of user position data. For example, a user traveling in a vehicle 230 is depicted as taking multiple trips, each trip having a starting position (i.e., origin) and a stopping position (i.e., destination).

For example, in the morning, the user may start at starting point 226, which may be the user's residence, and travel to Establishment 202 and stop for a period of time. In some embodiments, the amount of time that the user spends stopping at a location before moving again determines whether the location constitutes a stopping position or destination. In other words, in such embodiments, if the user stops at a position for longer than a certain time threshold (e.g., 5 minutes), the user is considered to be at a stopping position. This stop-time threshold may help to differentiate, for example, a user "stopping" in traffic. In some cases, the stop-time threshold may be dynamic based on a current region of the user. For example, in some regions where significant traffic is expected, the stop-time threshold may be increased to avoid identifying incorrect stopping positions. A similar adjustment to the stop-time threshold may be made based on the time of day (e.g., where certain times of day, such as rush hour, may have a higher stop-time threshold due to significant traffic). Returning to the example depicted in FIG. 2, the user stops at establishment 202 (a gas station) in order to get gas, which creates a transaction record (i.e., for the purchase of the gas). This takes around 10 mins, for example, which is above the stop-time threshold in this example, which means the gas station constitutes a stopping position for the user. Once it is determined (e.g., by a mileage tracking application on the user's mobile device) that the user has stopped, a user position and associated timestamp may be recorded. For example, as shown in FIG. 2, a satellite-based position 250 may be recorded as the stopping position with an associated timestamp. Additionally, in some embodiments, a trip may be logged into the user's mileage tracking data with the user's starting point 226 (e.g., having a timestamp and a respective satellite-based position) as well as the user's stopping point (e.g., having a timestamp and satellite-based position 250). In some embodiments, each satellite-based position may comprise global positioning system (GPS) coordinates, such as latitudinal and longitudinal coordinates (e.g., up to 6 decimal places, although the measurement precision may be adjusted).

In the example depicted in FIG. 2, an area around satellite position 250 is formed with radius 240A. Radius 240A may define the threshold distance within which establishments are considered for matching to transactions, as described above. There is a tradeoff when considering the threshold distance for consideration. As depicted in FIG. 2, if the user had instead parked at satellite position 250, but walked to establishment 208 instead of establishment 202 (or in the case that the user actually went to both), an association with establishment 208 may not be made because it is outside of the threshold distance. Conversely, if the threshold distance is set much larger (e.g., if radius 240A is much longer), then many more establishments may need to be compared to transaction records, which may lead to increased processing time and even potentially more mismatches. Accordingly, the threshold distance, as depicted for example in FIG. 2 by radius 240A, may need to be adjusted for performance.

In some embodiments, the threshold distance may be dynamic based on a region or area of the user's position. For example, if the user is in a dense region (e.g., an urban environment), the threshold distance for consideration may be decreased from a default threshold in order to avoid capturing too many establishments. If, instead, the user is in a sparse environment (e.g., a rural environment), then the threshold distance for consideration may be increased from the default threshold. In some embodiments, the threshold distance can also be determined using a clustering analysis, such as the k-means or density-based spatial clustering of applications with noise (DBSCAN).

Returning to the example depicted in FIG. 2 after getting gas, the user may travel to establishment 210, at which the user may spend a few hours. For example, the user goes to a job site for the day (Establishment 210) where the user buys lunch from a local vendor, thereby creating another transaction record. The mileage tracking application on the user's mobile device may log a second trip for the user with a starting point at satellite position 250 (e.g., including a set of position coordinates and a timestamp) and a stopping point at satellite position 260. As depicted, Establishment 210 is in a less dense region and so the radius 240B is larger than that of 240A. Notably, this need not be the case (i.e., the same threshold distance may always be used), but here different distance thresholds are shown as examples.

After the user is done with work at the job site (i.e., Establishment 210), the user then travels to establishment 216, which is a restaurant, where the user eats dinner and creates another transaction record. Here again, the mileage tracking application may log a third trip for the user with a starting position at satellite position 260 (near establishment 212) and a stopping position at satellite position 270 (near Establishment 216).

Notably, in the example described with respect to FIG. 2, there are several transactions created, some of which may qualify as business expenses (e.g., the gas purchase and the working lunch), and some of which may qualify as personal expenses (e.g., dinner). The transaction records themselves may not include detailed or even accurate time data. For example, the working lunch transaction may post on a weekend day. The user position data, which includes timestamps, may provide additional and more accurate data to a classification module such as described with respect to FIG. 1, in order to classify the various transactions. For example, because the user got gas from Establishment 202 during working hours, the classification module may classify that transaction as a business expense. As another example, because the user got dinner from Establishment 216 after working hours, the classification module may classify that transaction as a personal expense.

As described above, by matching a certain transaction with a certain corresponding user position data (e.g., satellite-based position data including timestamps), transaction time prediction module 110 may be able to provide improved transaction data to a classification module.

Figure 3:
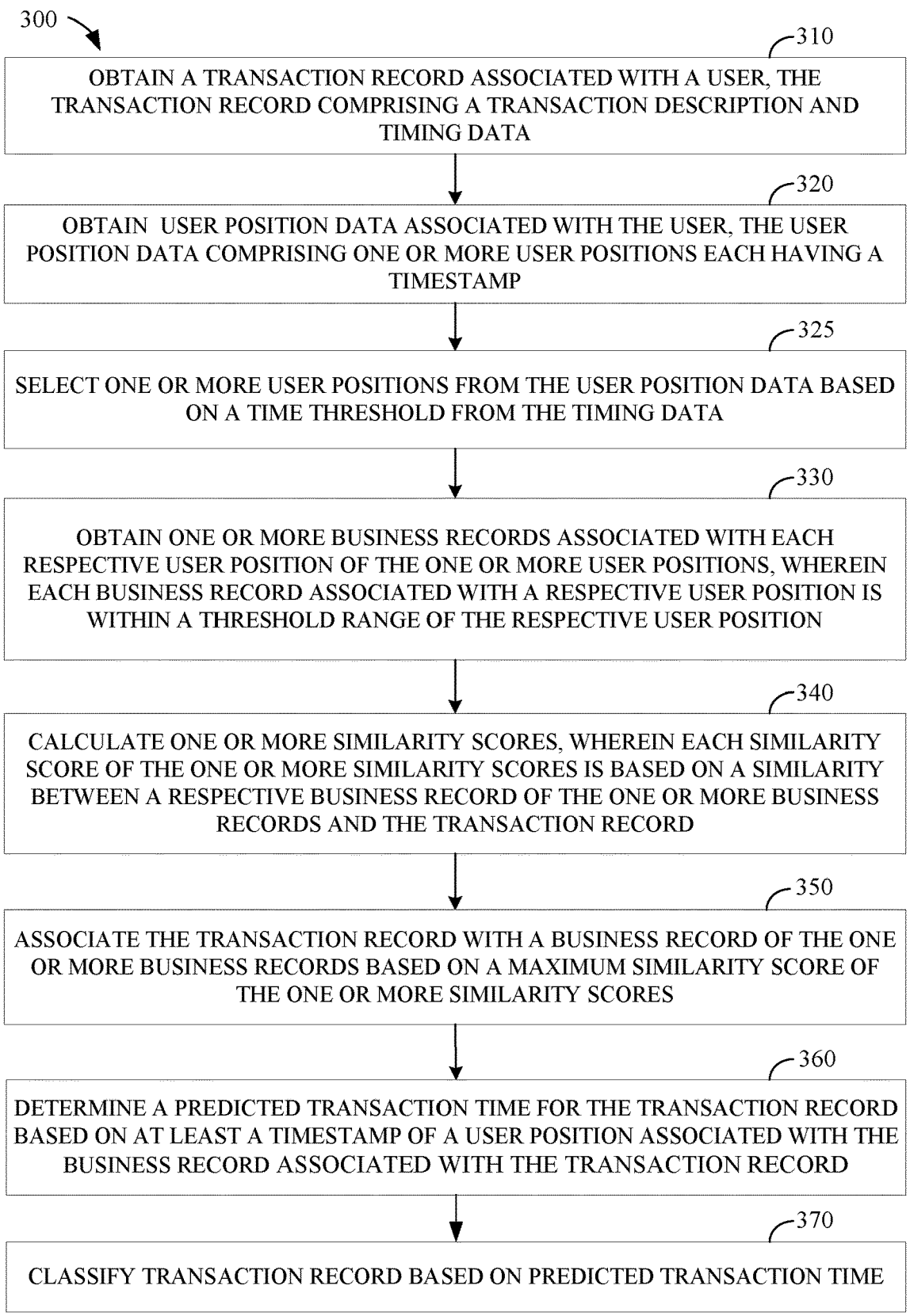
FIG. 3 illustrates an example method for predicting a transaction time for a user transaction based on satellite positioning data, in accordance with certain embodiments.

FIG. 3 illustrates example operations of a method 300 for predicting a transaction time for a transaction based on user position data, such as satellite positioning data. For example, method 300 may be performed by the system described with respect to FIG. 1.

At step 310, a transaction record associated with a user is obtained (e.g., by transaction time prediction module 110 of API service 108 in FIG. 1). In some embodiments, the transaction record comprises at least a transaction description, a transaction amount, and transaction timing data. As described above, the transaction timing data included with the transaction record may not be detailed enough (e.g., may only include a date) or may not be accurate (e.g., it may reflect a posted date rather than an actual transaction date, as described above). For example, with reference to FIG. 1, API service 108 obtains a transaction record for the transaction through an API call made to API service 108 by application 120. The transaction record for the transaction may include a description, such as "GAS123, San Diego, Calif.," and timing data including a transaction date, such as "Feb. 14, 2018." In such an example, the timing data only indicates a date and not the actual time at which the user conducted the transaction. In fact, the transaction date (e.g., Feb. 14, 2018) indicated by the timing data may not even reflect the correct date of the transaction, as the transaction could have been batch processed on a later date.

At step 320, user position data associated with the user are obtained (e.g., by transaction time prediction module 110 of API service 108 in FIG. 1). The user position data may include one or more user positions and associated timestamps. In some cases, the user position data is satellite-based position data comprising positions and associated timestamps. In one example, the user position data is from mileage tracking data generated, for example, by an application on a user's mobile device.

At step 325, the one or more user positions are selected from the user position data based on a time threshold from the transaction record's timing data (e.g., by transaction time prediction module 110 of API service 108 in FIG. 1). For example, the user positions may be chosen based on a threshold of up to one day before the transaction date of Feb. 14, 2018, as indicated by the timing data. In such a case, all user positions from one day before the transaction date through the transaction date would be selected. This time threshold therefore accounts for transactions that "post" later than the transaction was actually completed. The period of time from the transaction date to the threshold may be referred to as the search period. So, for example, if the transaction date was Feb. 14, 2018 and the threshold was one day, then the search period would include all user positions from Feb. 13, 2018 through Feb. 14, 2018.

In some embodiments, step 325 may not be necessary where a request (by API service 108 to, for example, application 120) for user position data may include filtering parameters that limit the number of user positions obtained. For example, a request to obtain user position data may include a parameter that limits the amount of position data returned consistent with the one-day time threshold, discussed above, in which case the user position data that is obtained would only include user positions recorded up to one day before the transaction date (all user positions from Feb. 13, 2018 through Feb. 14, 2018, in the example above).

In some embodiments, the one or more user positions may correspond to the stopping points of all of the user's trips during the search period. In some embodiments, the one or more user positions may correspond to the starting points of all of the user's trips during the search period. In further embodiments, additional user positions may be obtained as well. For example, in addition to obtaining user positions for each trip's stopping point, user position for each trip's starting point may be also be obtained.

At step 330, one or more business records associated with each of the one or more user positions are obtained (e.g., by transaction time prediction module 110 of API service 108 in FIG. 1). A business record may comprise data about a business, such as its name, address, position (e.g., GPS coordinates), phone number, email address, keywords, establishment type, and others. For example, FIG. 4B, described below, depicts one example of a business record.

The one or more business records may be selected based on a distance threshold from a user position. For example, only businesses within 100 meters of a user position may be considered in order to limit the total number of businesses considered. Notably, 100 meters is just one example and many other thresholds can be used. Further, as described above with respect to FIG. 2, in some cases the distance threshold may be dynamic and may change based on a region of the user (e.g., urban versus rural) or characteristic of the user's position.

In one embodiment, the business records are obtained by calling an API provided by a third party entity (e.g., third-party entity 140 in FIG. 1). For example, a request sent to the third-party entity may include the one or more user positions (e.g., GPS coordinates of the stopping points of each user trip) as well as one or more distance thresholds. In an example where there is only one distance threshold, it may be included as a single parameter with the request. However, in other examples where there are different thresholds for different user positions (as described above with respect to FIG. 2), the user positions may be sent in a data structure that associates each position with a distance threshold (e.g., a vector data format). The third-party entity may respond with one or more business records related to businesses or establishments within the threshold distance(s) of the one or more user positions. As described above, the distance threshold may effectively limit the number of businesses considered for any given user position, therefore making the procedure more efficient.

Referring back to, FIG. 2 user position 250 has a distance threshold 240A (in this example, a radius) of 100 meters around the position, which includes establishments 204 and 202. User positions 260 and 270, which are in sparser regions, have distance thresholds 240B of 200 meters around the position. As above, these are merely examples and other sizes and shapes of threshold regions are possible (e.g., boxed regions rather than circular).

Returning to FIG. 3, at step 340, one or more similarity scores are calculated, wherein each similarity score of the one or more similarity scores is the result of comparing a transaction record to the one or more business records (e.g., similarity score calculator 114 of transaction time prediction module 110 in FIG. 1). The comparison may be according to a mathematical function. For example, the discussion of FIG. 4A, below, describes one example of calculating similarity scores based on a function of various similarity metrics. Note that a similarity score may also be referred to as a likelihood score representing a likelihood or probability that the transaction associated with the transaction record occurred at an establishment corresponding to the business record.

At step 350, the transaction record is associated with a business record of the one or more business records based on a maximum similarity score of the one or more similarity scores (e.g., as determined by transaction time prediction module 110 of API service 108 in FIG. 1).

At step 360, a predicted transaction time for the transaction record is determined based on at least a timestamp of the user position associated with the business record associated with the transaction record (e.g., as determined by transaction time prediction module 110 of API service 108 in FIG. 1). For example, as described below in relation to FIG. 4A, a predicted transaction time is determined for the transaction based on a timestamp "2/14/2018, 8:32 AM" of a user stopping position associated with a business record for to "PEGAS GAS STORE 123", which has the highest similarity score with transaction A.

After determining a predicted transaction time for transaction record the transaction record may be updated with the predicted transaction time. In some cases, the update may include adding a transaction time as there may only be a transaction date. In other cases, it may mean updating the transaction time provided by the third party (e.g., the financial institution) to the predicted transaction time.

At step 370, the updated transaction record may then be classified by a model based at least in part on the predicted transaction time, such as by machine learning model 118A of classification module 116 in FIG. 1. The classification accuracy of the model (e.g., choosing between a business expense or a personal expense) is improved by virtue of the predicted transaction time.

Once a classification for the transaction is determined, an application, such as application 120 in FIG. 1, may use the classification to perform application-specific functions, such as those described above (e.g., update an aggregate amount etc.). In some embodiments, the transaction classification may also be communicated to the mileage tracking application, which may use the classification to tag a corresponding trip as, for example, a business or personal trip. This helps the mileage tracking application categorize certain trips as business-related and, therefore, report the mileage associated with such trips as a basis for deductible expenses.

As also described above, an application may solicit input from the user to verify that the classification is accurate. For example, application 120 in FIG. 1 may display a question such as "we believe this transaction is a business expense," or in another example, the application may display a notification such as "we believe you spent $3,233 in business expenses last week, is that correct?" As described above with respect to FIG. 1, training data is updated when the user's feedback is received. Thus, adding a time-related (i.e., time of transaction) attribute to attributes that are used by machine-leaning model, such as 118A in FIG. 1, for classifying transactions results in enhancing the training data's accuracy. As more classifications are performed and user feedback is received, machine-learning model 118A becomes significantly more accurate in classifying transactions.

In some embodiments, upon receiving user confirmation of a certain transaction classification, API service 108 may conclude that the classified transaction's association with a certain user position or trip is accurate and, therefore, assign the user position to transactions with similar attributes in the future. For example, the information may be stored in a lookup table for more efficient operation in future classifications. This may also help with transaction classification for users without mileage tracking data because the model is trained on all users' transactions.

As described above, although there are alternative ways of acquiring transaction times for use in a machine-learning model to classify transactions (e.g., acquiring the data from the bank at a significant cost or acquiring the transaction time for each transaction manually using different methods, which is highly ineffective and costly), predicting transactions times using user positions as described herein offers a cost-effective, accurate, and efficient way.

Figure 4A:
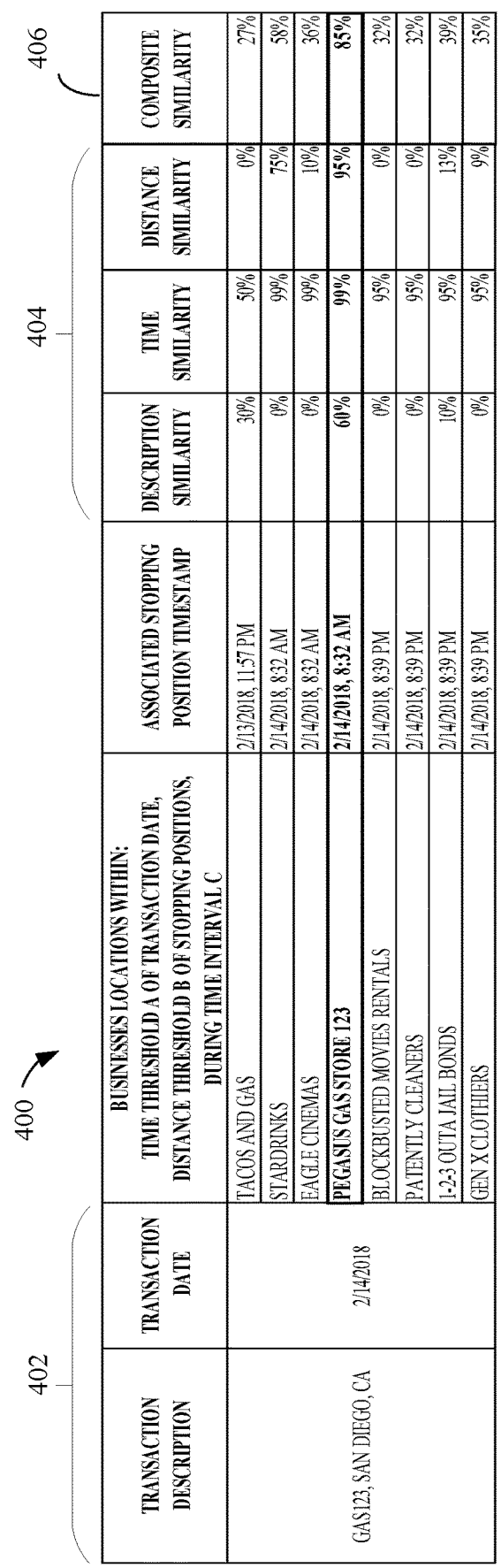
FIG. 4A illustrates a number similarity scores each based on a similarity between a transaction record and a business record, in accordance with certain embodiments.

FIG. 4A illustrates a table 400 including different types of similarity metrics that may be used for associating a business record with a transaction record 402. Specifically, table 400 illustrates a transaction description (i.e., "GAS123, San Diego, Calif.") for transaction 402 as well as a transaction date of Feb. 14, 2018, which may be indicated by the timing data received as part of the transaction record for transaction 402.

Figure 4B:
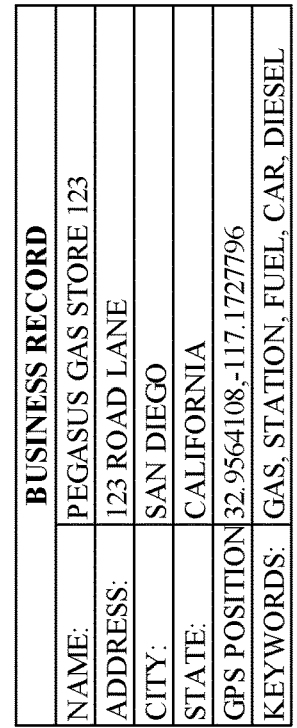
FIG. 4B illustrates a business record, in accordance with certain embodiments.

Table 400 also illustrates a number of business names derived from the business records obtained based on a user position (e.g., as described above with respect to step 330 of FIG. 3). For example, FIG. 4B illustrates an example of a business record 450 obtained based on a user stopping position (e.g., satellite position 250 near Establishment 202 in FIG. 2). As shown, in some embodiments, a business record may include a business name, address, city, state, GPS position, key words, and other information. Returning to FIG. 4A, for each business name, the table further includes a timestamp associated with a user position. As described above, the various business records are selected based on a threshold distance around a user's position, such as a user's stopping position.

For example, timestamp 2/14/2018, 8:32 AM is associated with a user position (e.g., satellite position 250, shown in FIG. 2), and three business records have been obtained based on being within the threshold distance (e.g., radius 240A, shown in FIG. 2) of the user position, including: STARDRINK (Establishment 203 in FIG. 2), EAGLE CINEMAS (Establishment 204 in FIG. 2), and PEGASUS GAS STORE 123 (Establishment 202 in FIG. 2).

For each of the business records, in some embodiments, one or more similarity metrics 404 are calculated, including in this example a description similarity metric, a time similarity metric, and a distance similarity metric. For example, a time similarity score may be calculated for each business record based on how close the time (e.g., hour, day, month, and/or year, etc.) indicated by transaction 402's timing data (e.g., Feb. 14, 2018, obtained as part of the transaction record) is to the time indicated by the timestamp (e.g., indicating hour, date, month, and/or year, etc.) of the user position utilized to obtain the business record. In another example, a distance similarity score may be calculated for each business record based on how close the GPS coordinates of the user position, used to obtain the business records, are to the GPS coordinates associated with the business record.

A variety of methods may be used to calculate individual similarity metrics 404, such as the description similarity metric. For example, suppose similarity score calculator 114 is calculating a description similarity score between transaction 402's transaction record and the business record shown in FIG. 4B. In some embodiments, the description similarity score may be calculated by determining the number of times an N-gram (or a token, generally) from a transaction record's descriptive string occurs in a business record divided by the number of N-grams resulting from featurizing the business record (e.g., only information including the business name and address in the business record may be featurized). For example, in such embodiments, a description similarity score is calculated by dividing the number of N-grams in transaction 402's descriptive string that occur in the business record of FIG. 4B by the number of grams resulting from featurizing the business record of FIG. 4B. For the purpose of featurizing a transaction's descriptive string as well as the business records, transaction time prediction module 110 may use featuring module 112 described above with respect to FIG. 1.

Another way of calculating a similarity metric, such as a description similarity, is by using a routine such as CountVectorizers (a feature provided by a machine learning library used in conjunction with a programming language such as Python) to convert transaction 402's descriptive string as well as the textual information included in business record of FIG. 4B into tokens.

In such embodiments, a similarity metric is calculated by determining a cosine similarity between the tokens of transaction 402's descriptive string and the tokens of, for example, business record of FIG. 4B (e.g., only information including the business name and address in the business record may be featurized). Notably, these are just a few examples of methods to calculate similarity metrics and others are possible.

In some embodiments, the tokens of transaction 402's transaction record may be clustered using a clustering algorithm (e.g., k-means) with the tokens of all the business records obtained based on one or more user positions. The clustering algorithm may then assign transaction 402's transaction record to a cluster, which may indicate a business record (e.g., business record of FIG. 4B). In some embodiments, if the cluster that the transaction is assigned to corresponds to two different business records, the statistical distance between transaction 402's transaction record and each of the business records may be calculated and the business record with a lower distance may be selected.

One or more of the similarity metrics may be combined via a function to calculate a composite similarity score 406 (e.g., by similarity score calculator 114 of transaction time prediction module 110 in FIG. 1). In this example, a simple average function is applied to the similarity metrics 404 to arrive at a composite similarity score 406, but in other embodiments other functions may be applied, such as weighted averages, decision trees, and other types of models. As described above, a composite similarity score 406 calculated for a certain business record reflects a likelihood that the transaction 402 occurred at the business associated with the business record. For example, table 400 shows an exemplary composite similarity score of 85% that reflects the likelihood that the transaction "GAS123, San Diego, Calif." happened at "Pegasus Gas Store 123". In some embodiments, the data stored in table 400 may be inputted into a clustering algorithm to determine the most likely mapping between transaction 402 and a business record.

Predicting a Transaction Time Based on User Receipts

In some embodiments, instead of or in addition to obtaining user positions for a given transaction record, API service 108 may obtain user receipts through the user's email account. For example, API service 108 may be integrated with the user's email account and send API requests to the email server requesting the user's receipts on a given day (e.g., using the user's credentials). As an example, the user may be emailed a receipt upon paying for gas at establishment 202 on Feb. 14, 2018. In such an example, API service 108 may obtain a user's receipts for Feb. 14, 2018, which includes the receipt that the user received via email from establishment 202. In some other embodiments, API service 108 may obtain user receipts that are uploaded automatically or by the user after each transaction. The receipts may be uploaded through application 120 and sent to API service 108. Regardless of how they are received, the receipts may be OCR'ed (optical character recognition) and the information recorded in the receipts may then be collected and used to determine a matching receipt for the transaction record (i.e., by calculating similarity scores, as described in step 340 with reference to FIG. 3).

In embodiments where API service 108 uses the user's receipts for predicting a transaction time, featuring module 112 featurizes the information recorded in the receipts using one or more of the methods described above (e.g., N-grams etc.). For example, a receipt may contain information such as the name of the establishment, the address, the transaction amount etc. The transaction record's grams or tokens may then be compared with the grams and tokens of each of the receipts in search for a matching receipt. For example, five receipts may be obtained, one of which may be the receipt issued to the user relating to the gas payment. In such an example, one of the ways a transaction may be matched with the gas payment receipt is a comparison between the transaction amount in the transaction record and the transaction amount collected from the receipt. In some embodiments, one or more of the similarity score calculation methods discussed above may also be used to find the matching receipt.

Once one or more similarity scores are calculated, API service 108 associates the transaction record with a receipt corresponding to the highest similarity score calculated or with a receipt having the same transaction amount. As described above, the similarity score may represent a likelihood or probably that the transaction associated with the transaction record occurred at an establishment corresponding to the business record. In some embodiments, a threshold may be defined such that if the highest similarity score is below the defined threshold, an association between the transaction record and the receipt corresponding to the highest similarity score may not be made. Subsequently, API service 108 determines a predicted transaction time for the transaction record based on a timestamp associated with the receipt or the timestamp associated with the email containing the receipt etc.

Figure 5:
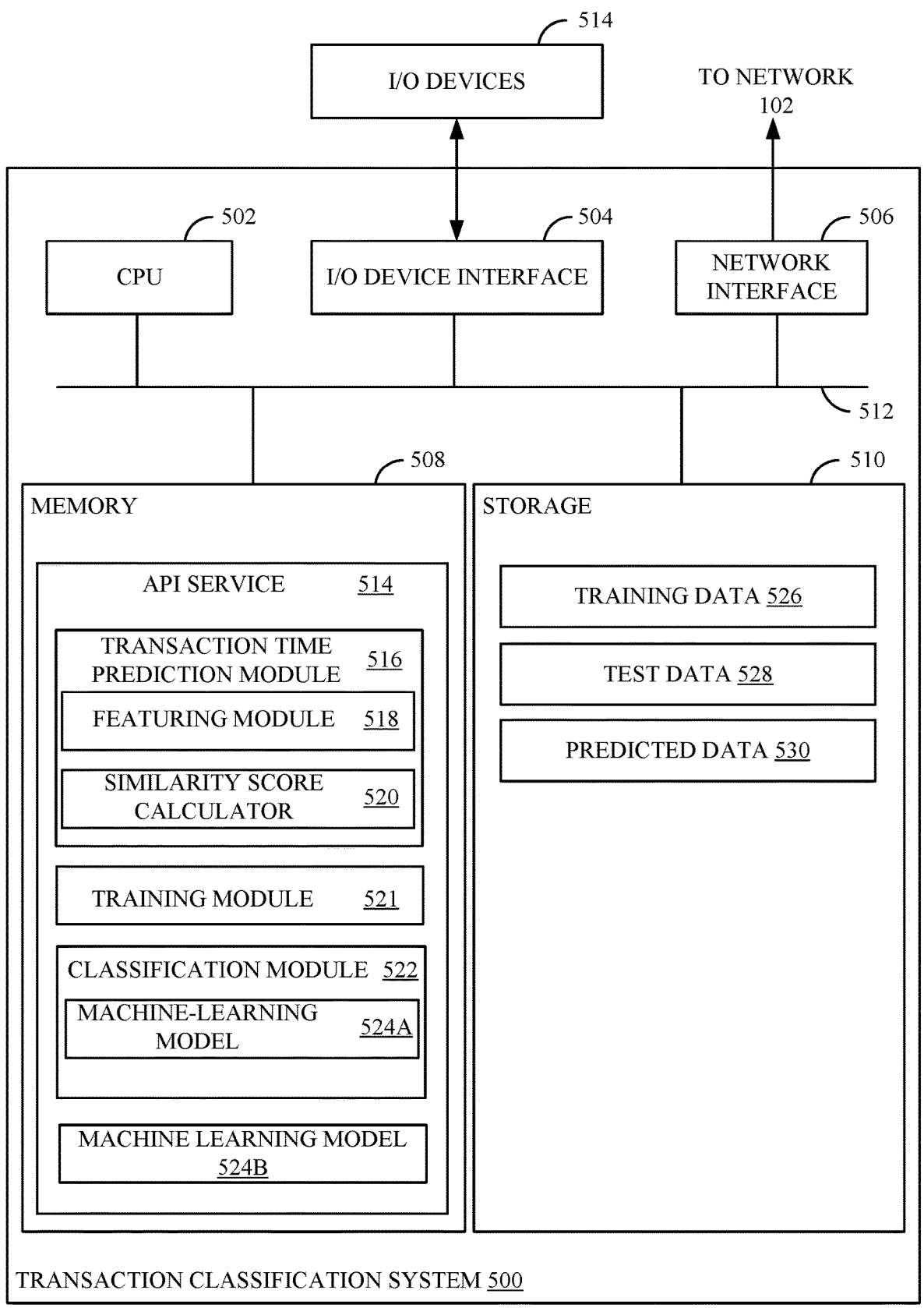
FIG. 5 illustrates a transaction classification system that classifies transactions based on transaction times associated with the transactions, in accordance with certain embodiments.

FIG. 5 illustrates a transaction classification system 500 that classifies transactions (i.e., predicts classifications for transactions). As shown, the transaction classification system 500 includes, without limitation, a central processing unit (CPU) 502, at least one I/O device interface 504 which may allow for the connection of various I/O devices 514 (e.g., keyboards, displays, mouse devices, pen input, etc.) to the transaction classification system 500, network interface 506, a memory 508, storage 510, and an interconnect 512.

CPU 502 may retrieve and execute programming instructions stored in the memory 508. Similarly, CPU 502 may retrieve and store application data residing in memory 508. Interconnect 512 transmits programming instructions and application data, among CPU 502, I/O device interface 504, network interface 506, memory 508, and storage 510. CPU 502 can represent a single CPU, multiple CPUs, a single CPU having multiple processing cores, and the like. Additionally, memory 508 represents random access memory. Furthermore, the storage 510 may be a disk drive. Although shown as a single unit, the storage 510 may be a combination of fixed or removable storage devices, such as fixed disc drives, removable memory cards or optical storage, network attached storage (NAS), or a storage area-network (SAN).

As shown, memory 508 includes an API service 514 comprising a transaction time prediction module 516, a classification module 522, a training module 521, and a machine-learning model 524B. Transaction time prediction module 516 includes featuring module 518 and similarity score calculator 520. Classification module 522 includes machine-learning module 524a. As shown, storage 510 includes training data 526. Training data 526 includes transaction information, metadata, and classifications (with correctness verified by users or through accuracy and reliability indicators) from previous transactions. Training module 521 trains machine-learning model 524B against training data 526. After a training session is complete, training module 521 copies machine-learning model 524B into classification module 522. Machine-learning model 524a is the copy that resides in classification module 522. Storage 510 may also include test data 528 and predicted data 530. For example, predicted data 530 may comprise predicted transaction times (generated by API service 514) associated with all transactions for which a classification was requested by application 120.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language of the claims.

Within a claim, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

What is claimed is:

1. A method of training a machine learning model, comprising:
   obtaining a transaction record associated with a user, the transaction record comprising a first transaction description;

obtaining one or more user positions associated with the user, wherein each user position of the one or more user positions corresponds to a timestamp;

obtaining a plurality of business records, wherein each respective business record of the plurality of business records:

comprises a respective transaction description, is associated with a user position of the one or more user positions; and corresponds to an establishment within a threshold range of a user position associated with the respective business record;

comparing the first transaction description to each respective transaction description of the plurality of business records;

calculating a similarity score for each respective business record based on the comparing;

associating the transaction record with a particular business record of the plurality of business records with a highest similarity score;

determining a transaction time for the transaction record based on a timestamp associated with the particular business record;

providing the transaction time for the transaction record as an input to a machine learning model that has been trained based on historical transaction times and historical classifications of historical transactions;

determining, based on an output from the machine learning model in response to the input, a classification for the transaction record;

receiving user input indicating whether the classification is accurate; and re-training the machine learning model based on the user input and the transaction time for the transaction record.

2. The method of claim 1, further comprising presenting, in a graphical user interface (GUI), an indication of the classification for the transaction record.

3. The method of claim 1, wherein each user position of the one or more user positions comprises global positioning system (GPS) coordinates.

4. The method of claim 1, wherein:

each respective transaction description of the plurality of business records of the one or more business records comprises at least one of a type of a given establishment or a name of the given establishment, and comparing the first transaction description to each respective transaction description of the plurality of business records comprises comparing at least one of the type of the establishment or the name of the establishment of the respective transaction description with the first transaction description of the transaction record.

5. The method of claim 1, wherein:

the transaction record further comprises timing data, and the method further comprises adjusting the timing data of the transaction record using the transaction time.

6. The method of claim 1, wherein:

the transaction record further comprises timing data, and the one or more user positions correspond to one or more dates within a search period defined based on the timing data.

7. A non-transitory computer readable medium comprising instructions that, when executed by a processor of a processing system, cause the processing system to perform a method of training a machine learning model, the method comprising:

obtaining a transaction record associated with a user, the transaction record comprising a first transaction description;

obtaining one or more user positions associated with the user, wherein each user position of the one or more user positions corresponds to a timestamp;

obtaining a plurality of business records, wherein each respective business record of the plurality of business records:

comprises a respective transaction description;

is associated with a user position of the one or more user positions; and corresponds to an establishment within a threshold range of a user position associated with the respective business record;

comparing the first transaction description to each respective transaction description of the plurality of business records;

calculating a similarity score for each respective business record based on the comparing;

associating the transaction record with a particular business record of the plurality of business records with a highest similarity score;

determining a transaction time for the transaction record based on at least a timestamp associated with the particular business record;

providing the transaction time for the transaction record as an input to a machine learning model that has been trained based on historical transaction times and historical classifications of historical transactions;

determining, based on an output from the machine learning model in response to the input, a classification for the transaction record;

receiving user input indicating whether the classification is accurate; and re-training the machine learning model based on the user input and the transaction time for the transaction record.

8. The non-transitory computer readable medium of claim 7, wherein the method further comprises presenting, in a graphical user interface (GUI), an indication of the classification for the transaction record.

9. The non-transitory computer readable medium of claim 7, wherein each user position of the one or more user positions comprises global positioning system (GPS) coordinates.

10. The non-transitory computer readable medium of claim 7, wherein:

each respective transaction description of the plurality of business records of the one or more business records comprises at least one of a type of a given establishment or a name of the given establishment, and comparing the first transaction description to each respective transaction description of the plurality of business records comprises comparing at least one of the type of the establishment or the name of the establishment of the respective transaction description with the first transaction description of the transaction record.

11. The non-transitory computer readable medium of claim 7, wherein:

the transaction record further comprises timing data, and the method further comprises adjusting the timing data of the transaction record using the transaction time.

12. The non-transitory computer readable medium of claim 7, wherein:

the transaction record further comprises timing data, and the one or more user positions correspond to one or more dates within a search period defined based on the timing data.

13. A computer system, comprising:
a memory comprising computer-executable instructions; and
a processor configured to execute the computer-executable instructions and cause the computer system to perform a method of training a machine learning model, the method comprising:
  obtaining a transaction record associated with a user, the transaction record comprising a transaction first description;
  obtaining one or more user positions associated with the user, wherein each user position of the one or more user positions corresponds to a timestamp;
  obtaining a plurality of business records, wherein each respective business record of the plurality of business records:
    comprises a respective transaction description;
    is associated with a user position of the one or more user positions; and
    corresponds to an establishment within a threshold range of a user position associated with the respective business record;
  comparing the first transaction description to each respective transaction description of the plurality of business records;
  calculating a similarity score for each respective business record based on the comparing;
  associating the transaction record with a particular business record of the plurality of business records with a highest similarity score;
  determining a transaction time for the transaction record based on a timestamp associated with the particular business record;
  providing the transaction time for the transaction record as an input to a machine learning model that has been trained based on historical transaction times and historical classifications of historical transactions;
  determining, based on an output from the machine learning model in response to the input, a classification for the transaction record;
  receiving user input indicating whether the classification is accurate; and
  re-training the machine learning model based on the user input and the transaction time for the transaction record.

14. The computer system of claim 13, the method further comprising presenting in a graphical user interface (GUI), an indication of the classification for the transaction record.

15. The computer system of claim 13, wherein each user position of the one or more user positions comprises global positioning system (GPS) coordinates.

16. The computer system of claim 13, wherein:
each respective transaction description of the plurality of business records of the one or more business records comprises at least one of a type of a given establishment or a name of the given establishment, and
comparing the first transaction description to each respective transaction description of the plurality of business records comprises comparing at least one of the type of the establishment or the name of the establishment of the respective transaction description with the first transaction description of the transaction record.

17. The computer system of claim 13, wherein:
the transaction record further comprises timing data, and
the method further comprises adjusting the timing data of the transaction record using the transaction time.

18. The computer system of claim 13, the method further comprising storing a user position associated with the business record associated with the transaction record in a lookup table for assignment to subsequent transaction records with attributes that are similar to those of the transaction record.

19. The method of claim 1, further comprising storing a user position associated with the business record associated with the transaction record in a lookup table for assignment to subsequent transaction records with attributes that are similar to those of the transaction record.

20. The non-transitory computer readable medium of claim 8, wherein the method further comprises storing a user position associated with the business record associated with the transaction record in a lookup table for assignment to subsequent transaction records with attributes that are similar to those of the transaction record.

* * * * *